United States Patent
Chang et al.

(10) Patent No.: US 7,532,257 B2
(45) Date of Patent: May 12, 2009

(54) SYSTEM AND IMPLEMENTATION FOR IF COMPENSATION FOR VIDEO DECODERS

(75) Inventors: Weider Peter Chang, Hurst, TX (US); Karl Hertzian Renner, Dallas, TX (US); Shereef Shehata, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 562 days.

(21) Appl. No.: 11/220,488

(22) Filed: Sep. 7, 2005

(65) Prior Publication Data
US 2007/0064151 A1    Mar. 22, 2007

(51) Int. Cl.
    *H04N 5/455* (2006.01)
(52) U.S. Cl. .................. 348/727; 348/728; 348/609
(58) Field of Classification Search ......... 348/638–670, 348/713, 724, 725, 21, 727, 728, 607, 608, 348/609, 612, 624, 622, 610
See application file for complete search history.

(56) References Cited

U.S. PATENT DOCUMENTS 2,923,765 A * 2/1960 Gargini .................. 348/492
4,183,051 A * 1/1980 Richman ................ 348/631
4,616,252 A * 10/1986 Schiff .................... 348/639

\* cited by examiner

*Primary Examiner*—M. Lee
(74) *Attorney, Agent, or Firm*—John J. Patti; Wade J. Brady, III; Frederick J. Telecky, Jr.

(57) ABSTRACT

Base band compensation for an IF stage in a television provides significant advantages over compensation applied to the composite signal. Each base band color difference signal is filtered to obtain cross-talk elements, which are then applied to the opposite channel to eliminate the cross-talk components from the color difference signal channels. The compensation technique is applicable to IF stages generally, including those based on SAW filters. High and low gain compensation of the cross-talk compensated signals may also be performed to reduce distortion in the compensated signals. The base band compensation tends to reduce or eliminate visual artifacts in a television image, especially where sharp contrast transitions occur in the image.

10 Claims, 11 Drawing Sheets

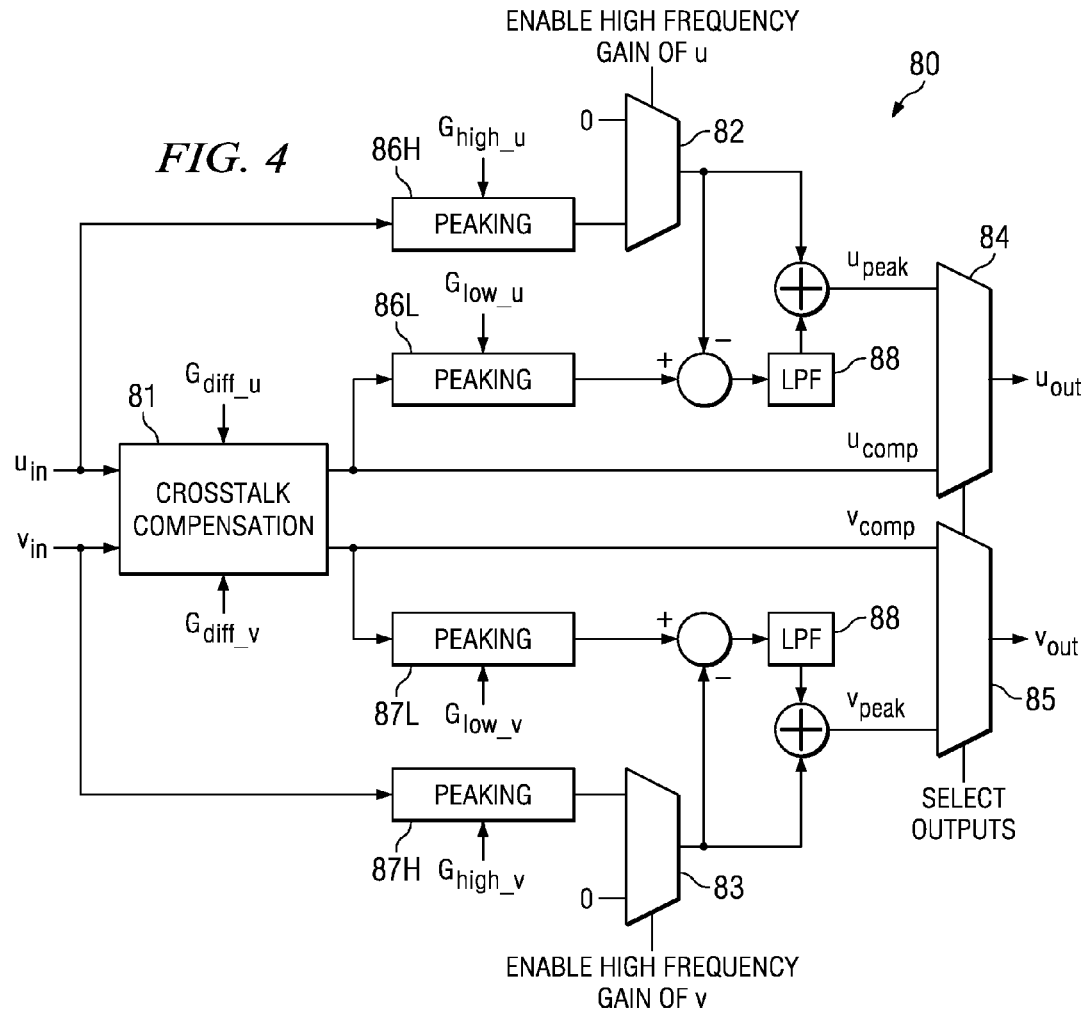
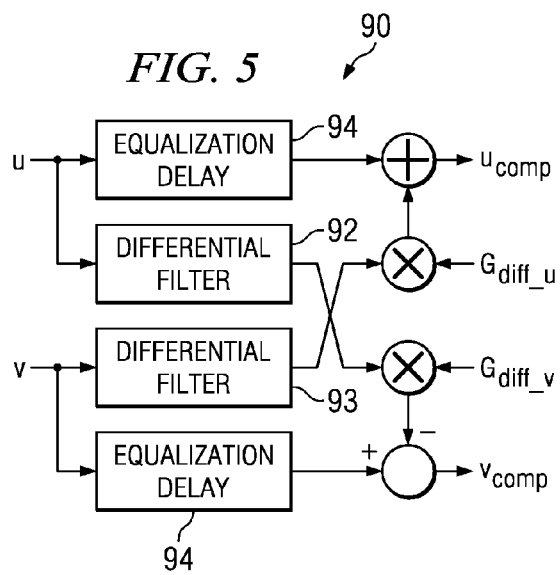
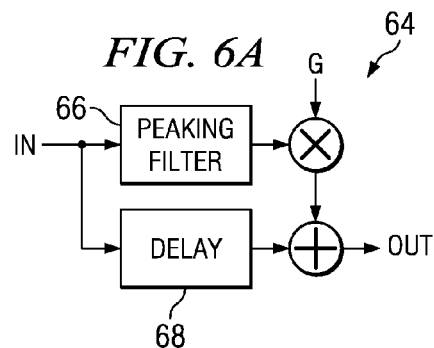

SYSTEM AND IMPLEMENTATION FOR IF COMPENSATION FOR VIDEO DECODERS

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

1. Field of the Invention

The present invention relates generally to video decoder systems, and relates more particularly to compensating distortion in video decoders.

2. Description of Related Art

According to a known standard, television images are decoded with a quadrature amplitude modulated (QAM) technique that is based on the decomposition of signals into uncorrelated orthogonal components. The components are processed to contribute to producing a television image with color information included in the components. Ideally, a base band signal with two components, for example, is frequency shifted for transmission, resulting in side band frequencies that are symmetrical in nature, so that there is no cross-talk or channel interference between the components during QAM decoding. However, in practice, the side band portions are distorted through transmission, or due to mistuning or other performance issues in an intermediate frequency (IF) stage of a video receiver. Lack of symmetry in the frequency side bands produces cross-talk in the decoded image when the QAM components are recombined in producing the video image.

A decoded TV image passed through a mistuned IF stage produces noticeable visual artifacts due to interference or cross-talk between the different decoding channels. Mistuning introduced in the IF stage introduces excessive and asymmetrical attenuation in the upper side band of the QAM color difference signal representing a color difference from a reference color having a specified chromaticity. The distortion of the upper side band signal introduces various visual artifacts that become especially noticeable near color boundaries due to the non-ideal conditions of the upper frequencies of the QAM color difference signal. The visual artifacts include discoloration and misalignment between color components, such as RGB or PrPb, near edges of the color transition. One particular area in television transmissions where the distortion is especially troublesome is at the edge of a human face, where the distortion causes an unnatural skin tone to be produced, that is easily observed by a video viewer. Because of the particular frequency spectrum, the color misalignment is most visible in the green-to-magenta transition of the radio frequency (RF) color bar signal. The misalignment of the color components results in the appearance of an intermediate color, such as red, for example, along an edge of the transition.

A particular source for this type of distortion is derived from cross-talk between two color difference signals represented in the signals U and V of a QAM decoding. The attenuation of a portion of the upper side band of the U and V color difference signals prevents the proper reconstruction of the video image in high frequency regions, such as are typically found in edge transitions.

FIG. 1 illustrates a situation where the frequency spectrum of two color difference signals U and V do not occupy the same bandwidth. The U and V frequency spectrums illustrated in FIG. 1 provide a spectrum V that has a slightly smaller bandwidth than the spectrum for signal U. Portions X and Y of the frequency spectrum in FIG. 1 illustrate the frequency attenuation of the tuner IF stage on the base band chroma. The frequency attenuation in regions X and Y contribute to distortion based on cross talk between the two color difference signals U and V. It would be desirable to provide a decoding compensation for the distortion and reduce or eliminate the visual artifacts that result from such a distortion.

One technique for reducing the distortion produced in a mistuned IF stage is to filter or compensate the composite signals in the QAM prior to decoding. According to this technique, a compensation is applied to diminish the crosstalk and distortion of the composite signal, often according to user-selectable frequency responses. For example, the compensation may be chosen to be flat, that is no compensation, 6 dB/octave, 12 dB/octave and applied to the IF stage to produce compensation for the distortion and cross-talk between two color difference signals. The compensation of 10 dB/MHz is used in the sequential color with memory (SECAM) television standard signals that are decoded using surface acoustic wave (SAW) filters specified for the phase alternating line (PAL) television reception standard.

Although the type of compensation described above does tend to reduce the effects of visible artifacts in a television signal slightly, the artifacts are still noticeably present. The persistence of the artifacts is due to the fact that the compensation is applied to the composite signal that includes the cross-talk and distortion information in a combined or coded state. The compensation does not separately address the sources of the problems associated with the visual artifacts that must be present in each channel. In addition to providing a general compensation to the overall composite signal, this approach provides a limited flexibility due to its general applicability for different types of tuners, and does not take into account tuners that have excessive and/or atypical distortion characteristics. An illustration of the compensation impact provided according to this conventional technique is illustrated in FIG. 2.

It would be desirable to provide a compensation for the IF stage of a QAM decoder that produces a metacompensation for the effects of distortion related to cross-talk between two color different signals. It would also be desirable to reduce or eliminate the resulting visual artifacts produced by the distortion and the loss of part of an upper frequency side band related to the QAM signal in a mistuned IF stage.

According to the National Television System Committee (NTSC) standard for television signal transmission, each channel is allotted six MHz, which includes four MHz for video and two MHz for audio. Typically, video transmissions are designed to be as wide as possible within the four MHz band allotted, without producing significant distortion in the video signal. In practice, however, distortion often occurs in the video signal, because the signal approaches the limit of the four MHz video band.

In QAM signals, a U and a V channel are provided that are ideally uncorrelated and orthogonal to each other. However, this ideal situation is only true if the side bands of the frequency shifted signal are symmetrical and without distortion. If one side band does become distorted, cross-talk interference or noise is observed in one or the other or both channels. In this instance, the U and V signals are no longer orthogonal. An example of sideband distortion is illustrated in FIG. 1

In the formation of the shifted frequency side bands, several different factors can contribute to distortion or the loss of symmetry in the side band frequencies. One such source is mistuning of an IF stage, which may tend to cause attenuation in the upper side band frequencies. The same result may occur from the use of a surface acoustic wave (SAW) filter that has a poor response characteristic. Often, a sharp transition in frequency in the input video signal produces cross-talk between high contrast areas that causes a fuzziness or "halo" around the sharply changing video features. These sharp transitions are often observed in an area sharply divided in contrast, as is often the case in the area surrounding a human face with a sharply contrasting background. The application of compensation in the composite stage of the decoder tends to reduce only the intensity of the halo, and does not substantially operate to reduce the effect or eliminate it altogether.

It would be desirable to reduce or eliminate the effect of distortion or cross-talk resulting in fuzziness or "halo"type characteristics in sharp transition features of a video signal.

BRIEF SUMMARY OF THE INVENTION

In accordance with the present invention, there is provided a system and method for reducing or eliminating the effects of distortion by a mistuned IF stage or poorly designed SAW filter. Compensation of the input television signal is provided in the base band signal, rather than in the composite signal, so that the effects of cross-talk are specifically targeted and reduced or eliminated. According to this inventive technique, the U and V signal channels are separated and an estimate of the cross-talk signal derived from each channel is calculated. The estimate can be based on a derivative function and realized through a differential filter, for example. Once an estimate is obtained for each separate channel, the component signals are manipulated in relation to the estimated signals drawn from the opposite channel. This manipulation provides the compensation for the cross-talk related to distortion of the decoded signal between the two channels. For example, the estimate derived from the V component channel may be added to the U channel component, while the estimate derived from the U channel component may be subtracted from the V channel component.

Optionally, high frequency attenuation may be compensated based on the component signal compensated with the estimates previously derived.

BRIEF DESCRIPTION OF THE SEVERAL VIEWS OF THE DRAWINGS

FIG. 4 is a system block diagram of an embodiment of the present invention;

FIG. 5 is a portion of a system block diagram illustrating cross talk compensation according to the present invention;

FIGS. 6A-6C are a peaking filter system block diagram and frequency response graphs;

DETAILED DESCRIPTION OF THE INVENTION

Figure 3:
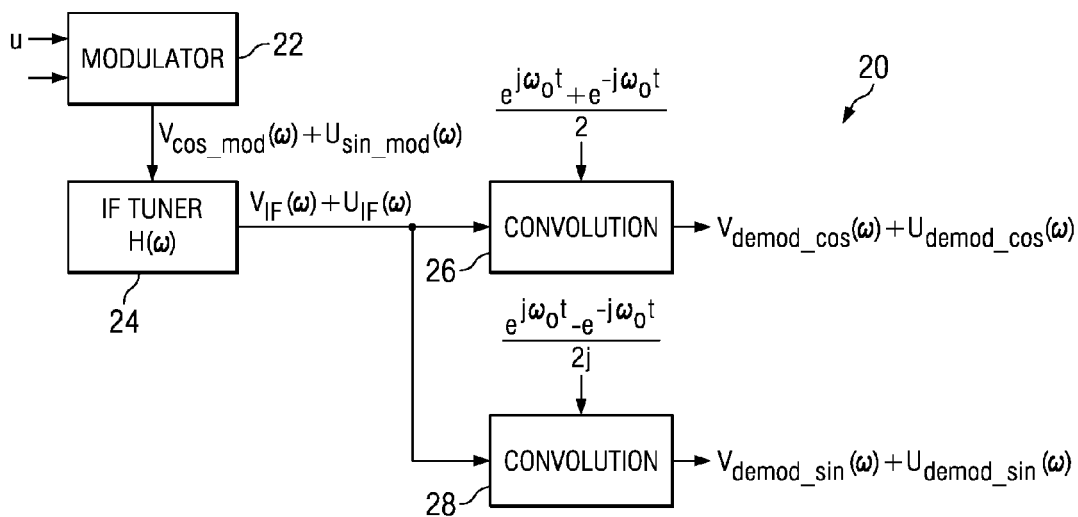
FIG. 3 is a conceptual block diagram in accordance with the present invention.

Referring now to FIG. 3, a conceptual model of the IF compensation is provided as part of an overall decoding system 20. A modulator 22 receives input U and V signals and produces frequency domain color components U and V, where the U color component is modulated by the sine of a color subcarrier $\omega_0$, and the V color component is modulated by the cosine of the color subcarrier $\omega_0$. These frequency domain signals are applied to IF tuner 24 having a transfer function H($\omega$) to produce frequency domain output signals $V_{IF}(\omega)$ and $U_{IF}(\omega)$. The output of IF tuner 24 is applied to demodulator blocks 26, 28, resulting in outputs that represent the sine and cosine demodulated signals U and V. This model of the IF modulation and demodulation system is used to formulate the compensation for the IF stage to reduce or eliminate the cross talk and/or distortion associated with attenuation of the upper side band of the frequency shifted signal.

Referring now to FIG. 4, a system block diagram 80 illustrates an alternate embodiment of the present invention. The system in block diagram 80 compensates for cross talk that occurs in the demodulated chroma components U and V, as well as compensating for the attenuation of the upper side bands, illustrated in FIG. 1. Selection points 82-85 provide multiplexing control to select either cross talk IF compensated signals, or cross talk plus gain compensated signals to be output from block diagram 80 as Uout and Vout. For example, selection point 82 enables or disables the amount of peaking applied to high frequency bands of the uncompensated U signal, contributing to a cross talk plus gain compensated output Upeak. Selection point 83 performs a similar function for the amount of peaking applied to higher band frequencies of the uncompensated V signal, contributing to a cross talk plus gain compensated output Vpeak.

The cross talk and gain compensated outputs Upeak and Vpeak are also derived from a variable gain lower band frequency cross talk compensated signal, with the variable gains GlowU and GlowV, respectively. Variable gains GlowU and GlowV control the amount of peaking applied to the lower band of frequencies of the compensated U and V signals, Ucomp and Vcomp, respectively. Selection points 84, 85 provide outputs Uout and Vout based on whether cross talk compensated or cross talk plus gain compensated outputs are desired. Selection points 84, 85 may be operated independently, so that output Uout is connected to the cross talk plus gain compensated output Upeak, while output Vout is connected to the cross talk compensated signal Vcomp, for example. Any type of control combination for selection points 84 and 85 is possible according to this control scenario.

Peaking filters 86H, 86L are coupled to the uncompensated input Uin, and the compensated signal Ucomp, respectively, to contribute to providing the cross talk and gain compensated output Upeak. Likewise, peaking filters 87H, 87L are coupled to the uncompensated input Vin and cross talk compensated signal Vcomp, respectively, to contribute to the cross talk and gain compensated output Vpeak. Each of peaking filters 86H, 86L, 87H and 87L have an associated variable gain, GhighU, GlowU, GhighV and GlowV, respectively. Each of these variable gains control the amount of peaking applied to the corresponding frequency band compensated by the associated peaking filter. Depending upon the desired signal response, cross talk and gain compensated outputs Upeak and Vpeak can have a high frequency gain compensation element, as provided by selection points 82, 83, or may be composed of low frequency variable gain and cross talk compensated signals derived from peaking filters 86L and 87L, respectively, for example. Low pass filters 88 also contribute to cross talk and gain compensated outputs Upeak and Vpeak bypassing the low frequency band components associated with the outputs of peaking filters 86L, 87L. Depending upon the control applied to set points 82, 83, low pass filters 88 also pass low frequency components that are potentially diminished by the lower band frequency components that are output from peaking filters 86H and 87H. Cross talk compensation block 81 provides the cross talk compensated signals Ucomp and Vcomp, respectively, based on variable gains GdiffU and GdiffV, which control the amount of cross talk compensation applied to uncompensated input signals Uin and Vin, respectively. The cross talk and gain compensated outputs Upeak and Vpeak can be written in equation form to reflect the operation of system block diagram 80.

$$u_{peak} = LPF * (G_{low\_u} * u_{comp} - G_{high\_u} * u_{in}) + G_{high\_u} * u_{in}$$
$$= LPF * G_{low\_u} * u_{comp} + (1 - LPF) * G_{high\_u} * u_{in}$$
$$v_{peak} = LPF * (G_{low\_v} * v_{comp} - G_{high\_v} * v_{in}) + G_{high\_v} * v_{in}$$
$$= LPF * G_{low\_v} * v_{comp} + (1 - LPF) * G_{high\_v} * v_{in}$$

Figure 1:
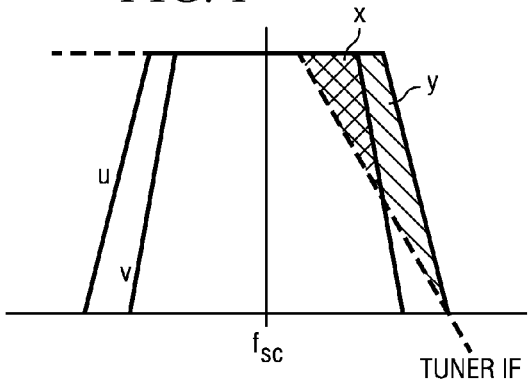
FIG. 1 is a frequency spectrum plot of two color difference signals.
Figure 2:
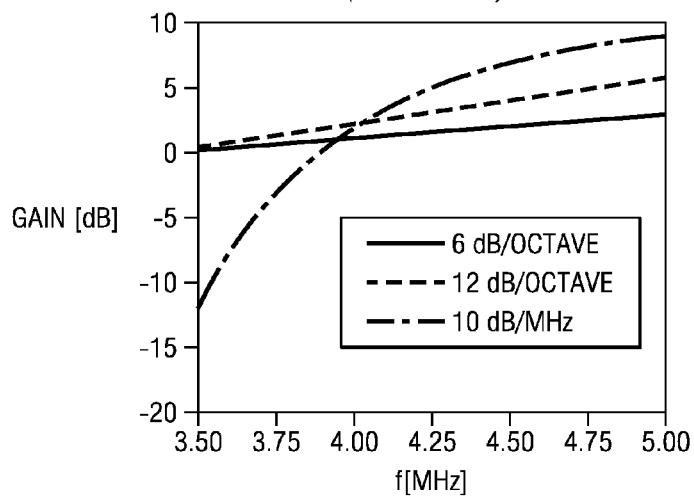
FIG. 2 is a graph showing frequency compensation in accordance with a conventional design.

The equations for Upeak and Vpeak illustrate how the low and high frequencies can be amplified by the respective gains provided in system block diagram 80. This is a particularly important feature that can accommodate U and V frequency spectrums that do not have the same bandwidth. When the frequency spectrums of signals U and V have the same bandwidth, both color difference signals have the same cross talk and gain attenuation. In such a situation, the same differential gains and low and high frequency gains are applied to both color difference signals U and V. However, if the frequency spectrums of color difference signals U and V have different bandwidths, the symmetry of the IF compensation changes. This situation is illustrated in FIG. 1, where color difference signal U has a greater bandwidth than color difference signal V.

Referring now to FIG. 5, the operation of cross talk compensation box 81 is illustrated in system block diagram 90. System block diagram 90 shows the uncompensated color difference signals U and V input into differential filters 92, 93, the outputs of which are supplied to multipliers with variable differential gains GdiffU and GdiffV. The output of differential filter 92 is supplied to a multiplier that is used to produce the cross talk compensated signal Vcomp in the other color difference channel, while the output of differential filter 93 is supplied to a multiplier used to provide cross talk compensated signal Ucomp. Differential gains GdiffU and GdiffV are variable to provide the desired gain for the particular color difference signal. Note that the output of differential filter 93 multiplied by gain GdiffU is added to the uncompensated color difference signal U to produce cross talk compensated signal Ucomp, while the output of differential filter 92 multiplied by gain GdiffV is subtracted from uncompensated color difference signal V to achieve cross talk compensated signal Vcomp. Equalization delay elements 94 provide proper time domain alignment for the uncompensated signals to be combined with the filtered signals to obtain properly aligned cross talk compensated signals Ucomp and Vcomp. Differential filters 92 and 93 may have coefficient weights of 1, 0, −1 to provide upward pulses that correspond to transitions on the input, for example. That is, differential filters 92 and 93 can be viewed as taking the first derivative of input color difference signals U and V to obtain a signal differential output. The adjustable gains GdiffU and GdiffV are applied to the differential filter outputs, and the result is added to the delayed signal U and subtracted to the delayed signal V to provide the cross talk compensated signals Ucomp and Vcomp.

Figure 6B:
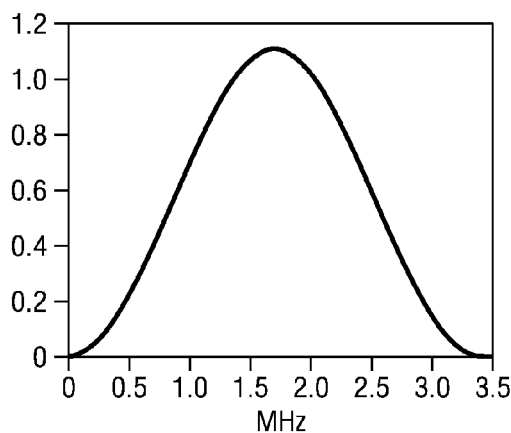
Figure 6C:
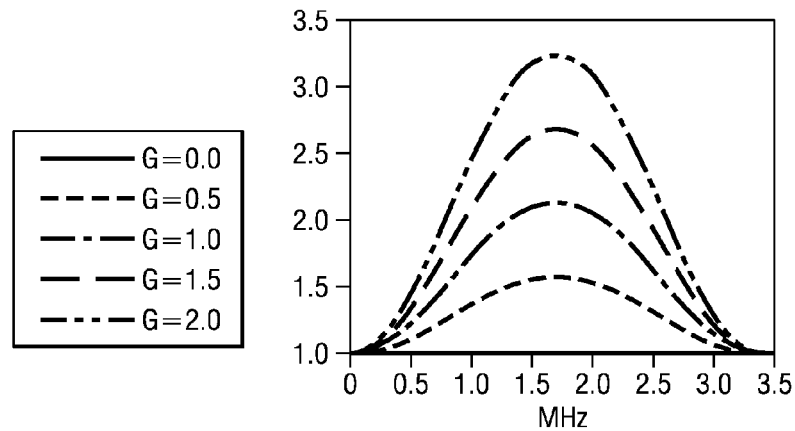

Referring now to FIGS. 6A-6C, the operation of peaking filters 86H, 86L, 87H and 87L is illustrated. FIG. 6A shows a system block diagram 64 that describes the operation of the peaking filters, where a peaking filter 66 is applied to the input of system block diagram 64, a gain G is applied to the output of peaking filter 66, and the gain compensated filter output is added to the delayed input to obtain the output of system block diagram 64. Delay element 68 is also coupled to the input of system block diagram 64 to provide a time domain alignment between the filtered signal and the unfiltered signal when they are added to produce the output of system block diagram 64. Referring to FIG. 6B, a graph showing the frequency response of peaking filter 66 is illustrated. As can be seen from the graph in FIG. 6B, the frequency response of peaking filter 66 has a bell-shaped curve with frequencies in the range of approximately 1.3-2 MHz being amplified where the magnitude is greater than one. The peaking filter tends to accentuate frequency peaks in the amplified range. The overall frequency response characteristics of the peaking filter in system block diagram 64 is illustrated in FIG. 6C, with various gains provided to illustrate the impact of gain on peaking amplifier characteristics.

Figure 7:
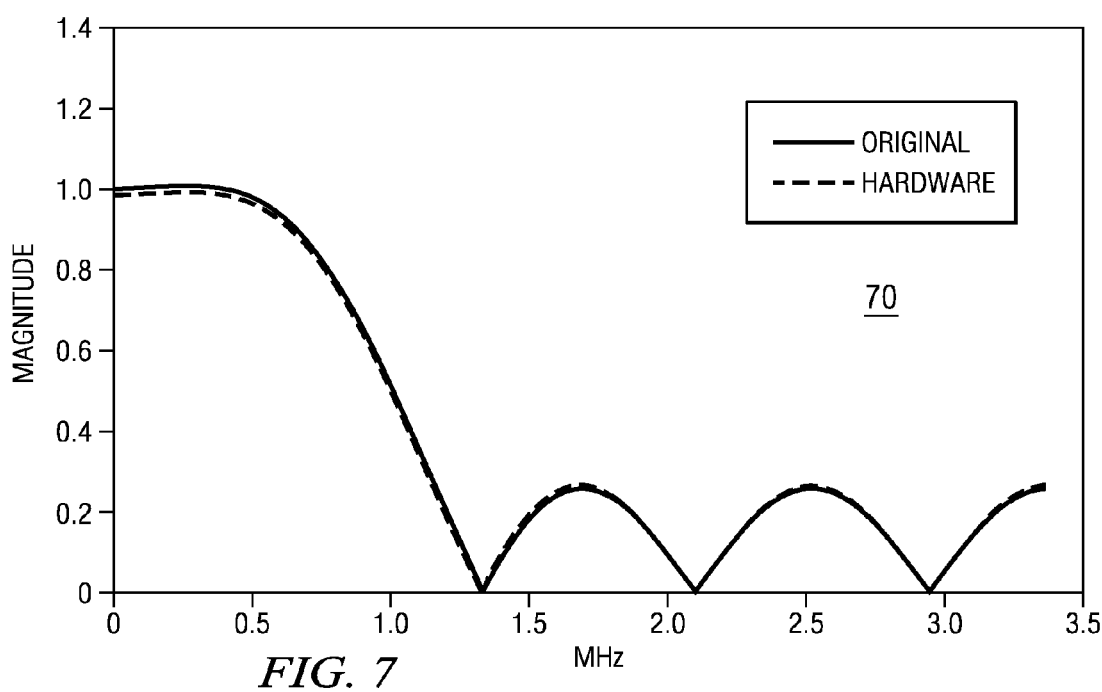
FIG. 7 is a graph of a frequency response of a bandwidth limiting filter in accordance with the present invention.

Referring now to FIG. 7, a graph illustrating the frequency characteristics of the baseband bandwidth limit filter, or low pass filter LPF, is illustrated as graph 70. The frequency response of the bandwidth limiting filter illustrated in graph 70 has a cutoff frequency of approximately 1 MHz to attenuate high frequency interference signals. The low pass filter limits the bandwidth of the color difference signals U and V to about 1 MHz, and establishes the low and high frequency bands. Accordingly, low pass filters 88 illustrated in FIG. 4 have a cut-off frequency of approximately 1 MHz.

As noted above, it is possible for the frequency spectrum of the U and V color difference signals to have different bandwidths, as illustrated in FIG. 1. In the frequency spectrum of FIG. 1, the frequency attenuation of the tuner IF stage on the base band chroma produces more cross talk from the frequency spectrum of color difference signal U into color difference signal V, and less cross talk from V into U.

Accordingly, the differential gains GdiffU and GdiffV can be separately adjusted to eliminate the imbalance in cross talk between the two color difference signals. Low frequency gains GlowU and GlowV may also be adjusted to compensate for attenuation of the cross talk compensated signals Ucomp and Vcomp in the region indicated with X in FIG. 1. The region indicated with Y in FIG. 1 of the uncompensated U color difference signal can also be boosted by gain GhighU when high frequency gain compensation is enabled. Table 1 below illustrates the relationship between differing frequencies spectrum bandwidths and the enablement of high frequency gains.

TABLE 1

| uv bandwidth | enable high frequency gain of u | enable high frequency gain of v |
|---|---|---|
| Same | 0 | 0 |
| u greater than v | 1 | 0 |
| v greater than u | 0 | 1 |
| u equal to v | 0 | 0 |

IF compensation control can be provided as a set of control bits in a digital control, with one possible control bit configuration illustrated in Table 2 below.

TABLE 2

| bit | description | default | recommendation |
|---|---|---|---|
| 0 | enable IF compensation | 0 | |
| 1 | select crosstalk &gain compensated outputs 0 = crosstalk compensated outputs only 1 = crosstalk &gain compensated outputs | 0 | for SAW IF stage set to 0 for non SAW IF stage set to 1 |
| 2 | enable high frequency gain of v | 0 | |
| 3 | enable high frequency gain of u | 0 | |

A digital control can also be used to provide the different differential gains for the color difference signals. One scenario is illustrated in Table 3, where the differential gain values are provided as four bit values in a digital control word. The differential gain can be adjusted based on how much distortion is realized in the IF stage. Accordingly, as illustrated in Table 3, a high differential gain can be selected when a high amount of distortion is experienced in the IF stage, while a low amount of differential gain can be provided when the IF stage distortion is low.

TABLE 3

| | | | | | recommendation | |
|---|---|---|---|---|---|---|
| bits | description | label | default | comment | IF stage distortion | setting |
| 7-4 | u differential gain | $G_{diff\_u}$ | 2 | actual gain = n/4 as n | low | 1 |
| | | $G_{diff\_v}$ | | | medium | 2 |
| 3-0 | v differential gain | | 2 | varies from 0 to 8 | high | 3-4 |

The low and high frequency gains Glow and Ghigh may also be provided with a digital control as four bit values, for example, as illustrated in Tables 4 and 5 below. The high frequency gains Ghigh may be enabled based on the control settings, as provided in Table 2, for example. The low frequency gains are always available according to system block diagram 80 in FIG. 4, and influence the compensation output if the cross talk and gain compensated outputs are selected with selection points 84, 85.

TABLE 4

| bits | Description | label | Default | comment |
|---|---|---|---|---|
| 7-4 | u low frequency gain | $G_{low\_u}$ | 4 | actual gain = n/4 as n |
| 3-0 | v low frequency gain | $G_{low\_v}$ | 4 | varies from 0 to 8 |

TABLE 5

| bits | Description | label | Default | comment |
|---|---|---|---|---|
| 7-4 | u high frequency gain | $G_{high\_u}$ | 0 | actual gain = n/4 as n |
| 3-0 | v high frequency gain | $G_{high\_v}$ | 0 | varies from 0 to 8 |

An exemplary procedure to adjust the compensation system illustrated in FIG. 4 calls for first providing the control appropriate to enable the IF compensation. For example, bit 0 in the control bits of Table 2 is set to an enable value, such as 1. This control enables operation of the compensation illustrated in system block diagrams 40, 50, 80 or 90, for example. Once the IF compensation is enabled, the cross talk compensated outputs are selected, such as by setting bit 1 in Table 2 to an enable value. At the same time, differential gains GdiffU and GdiffV are set to zero. A color bar test pattern is provided on the television receiver under test, to determine whether or not U and V bandwidths are the same by examining the cross talk pulses near color bar transitions. Any type of cross talk pulses near the color bar transitions would indicate overshoots and undershoots due to the sharp color transition. While the cross talk pulses are examined, the differential gains GdiffU and GdiffV are adjusted to eliminate the cross talk pulses. This procedure sets the compensation for the IF stage when cross talk compensation alone is used in the compensation mechanism.

Cross talk and gain compensation may be adjusted in an exemplary embodiment by selecting the cross talk and gain compensated outputs, for example by setting bit 1 of Table 2 to the value 1. In addition, the low and high frequency gains Ghigh and Glow are set to zero as a default starting point. The low frequency gains are then adjusted to obtain an optimum picture that provides increased sharpness in the edges of the color transitions. The gain is adjusted to improve the sharpness of the transitions by noting that improper gain levels will again produce overshoots and undershoots. Accordingly, the low frequency gains are adjusted to obtain a sharp color transition edge without producing undershoots and overshoots. The high frequency gains are then enabled, for example, by setting bits 2 and 3 of Table 2. Bits 2 and 3 of Table 2 are set depending upon the relationship of the frequency spectrum bandwidths of color difference signals U and V, as illustrated in Table 1. As a default, the system can initially be set to assume that the bandwidths of the color difference signals are the same, such that neither of the high frequency gains are enabled.

Once the appropriate high frequency gains are enabled, the gain values are adjusted for an optimum picture. An optimum picture is observed where the color transition edges are sharper with the adjusted gains. Again, over-adjustment of the high frequency gains may distort the color transition edges leading to a less optimum picture. A color transient improvement (CTI) configuration or technique may also be used to sharpen the edges of the color transitions in conjunction with the compensation according to the present invention.

Figure 8:
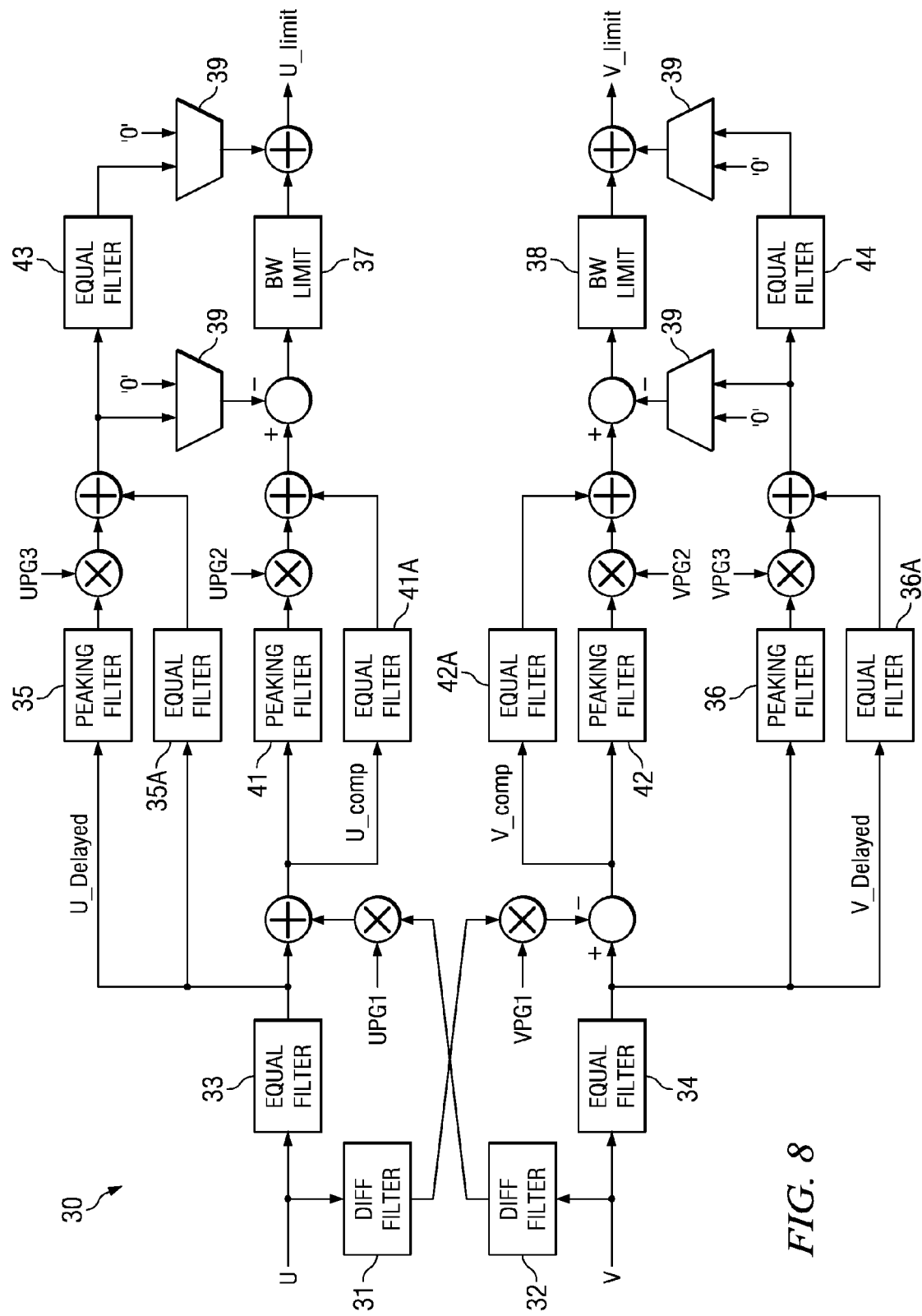
FIG. 8 is a system block diagram of an embodiment of the present invention.

Referring now to FIG. 8, a system block diagram 30 illustrates an IF compensation architecture in accordance with an exemplary embodiment of the present invention. Input component signals U and V are applied to IF compensation system 30 to produce outputs Ucomp and Vcomp, representative of compensated U and V component signals that are applied to the IF stage. In addition, output signal Ulimit and Vlimit are developed to contribute to compensation for high frequency response in the frequency shifted signal.

Component signals U and V are supplied to differential filters 31, 32 respectively, to obtain an estimate of the cross-talk between the two color difference signals. The output of differential filters 31, 32 is applied to respective multiplication nodes that amplifies signals by a gain factor of UPG1 or VPG1. The amplified signals are then combined with the original color difference signals U and V that are passed through equalizing filters 22, 34, respectively. Note that the estimate of the cross-talk signal obtained at the output of the differential filters is added to the U color difference signal, and subtracted from the V color difference signal. The outputs of the combinatorial nodes represent the compensated U and V color difference signals, Ucomp and Vcomp. Output Ucomp and Vcomp represent the compensated U and V color difference signals that are modified based on an estimate of the cross-talk produced by the distortion of the side bands of the frequency shifted signal.

Gains UPG1 and VPG1 may be applied as particular values in relation to the characteristics of the IF stage, or can be dynamic in nature. The estimate derived from the V color difference signal is added to the equalized U color difference signal, while the estimate derived from the U color difference signal is subtracted from the equalized V color difference signal because of the different frequency ranges that the U and V color difference signals represent. The spectrum of the U color difference signal is typically greater than that of the V color difference signal. The difference in bandwidth allocation for the color difference signals U and V is due to the characteristics of the human eye and perception of various colors. Because the color difference signals U and V occupy different bandwidths, the cross-talk components form each channel are added or subtracted based upon their bandwidth coverage. Accordingly, the channel with the smaller bandwidth, typically representative of blue color shades, has cross-talk interference estimation added, while the channel with the larger bandwidth, typically associated with red color shades, has the cross-talk interference estimate subtracted.

Once compensated channel signals Ucomp and Vcomp have been determine, another stage in architecture 30 provides gain compensation for the distortion due to the attenuation of the upper side bands of the shifted frequency signal. The output of equalizing filters 33, 34 provides a specified delay for the channel signals, resulting in outputs Undeleted and Delayed, respectively. The delay signals are provided to a peaking filter 35 and 36, for each of the color difference channels U and V, respectively. An equalizing filter 35A and 36A provides a specified delay to accommodate the timing of the outputs of peaking filters 35, 36. Once the signals Undeleted and Delayed are passed through peaking filters 35, 36, respectively, they are amplified with gain factors UPG3 and VPG3, respectively. The values for UPG3 and VPG3 reflect the amount of peaking control for high frequency regions of the channel signals. Accordingly, increasing the values of UPG3 and VPG3 increases the contribution of high frequency elements to the final output color difference signals, while decreasing the values tends to diminish the impact of high frequency components.

By combining the differential signals obtained from the opposing color difference channel, signals Ucomp and Vcomp lose high frequency components Gain compensation may be applied to diminish the impact of this loss. Because the channel color difference signals are bandwidth limited, as indicated in blocks 37, 38, the compensated color difference signals Ucomp and Vcomp are applied to peaking filters 41, 42 to boost high frequencies in the compensated signals. The outputs of peaking filters 41, 42 are amplified by gains UPG2 and VPG2, respectively, to control for an amount of low frequency peaking. Equalizing filters 41a and 42a act as delays to ensure proper timing with the outputs of peaking filters 41, 42.

The application of the peaking filters on the compensated signals Ucomp and Vcomp is combined with the results of the application of the peaking filters 35, 36 to the uncompensated color difference signals to produce cross talk compensated and gain compensated color difference signals. These frequency and distortion compensated signals are applied to bandwidth limited blocks 37, 38 to produce individual band limited color difference signals Ulimit and Vlimit that may then be used as substitute color difference signals, or in conjunction with base band color difference signals U and V in the modulation of those signals, as shown, for example, in modulator 22 of Gis. 2. Equalizing filters 43, 44 provide a specified delay for combination with bandwidth limited signals produced by blocks 37, 38.

The high frequency peaking controlled signals are provided to multiplexers 39, which supply either the high frequency gain compensated signals or no signals to be combined with the frequency and distortion compensated signals use to produce signals Ulimit and Vlimit. The high frequency gain compensated signals may be added or subtracted when combine with the frequency and distortion compensated signals, depending upon the configuration of multiplexers 39.

The overall operation of system 30 in FIG. 4 illustrates how low and high frequency bands can be isolated and peaked. Separate gains are provided to boost the low and high frequency bands depending upon the relationship between the U and V component bandwidths. The operation of system 30 can be described according to the following equations for the outputs of Ulimit and Vlimit, in which LPF represents a low pass filter to perform bandwidth limiting.

$$Ulimit = LPF * (UPG2 * Ucomp - UPG3 * U) + UPG3 * U$$

$$= LPF * UPG2 * Ucomp + (1 - LPF) * UPG3U$$

$$Vlimit = LPF * (VPG2 * Vcomp - VPG3 * V) + VPG3 * V$$

$$= LPF * VPG2 * Vcomp + 1(1 - LPF) * VPG3V$$

The outputs Ulimit and Vlimit are functions of the gains UPG2 and VPG2 applied to a low frequency band output from the LPF. Gains UPG3 and VPG3 are applied to a high frequency band output from the complementary filter 1-LPF. Accordingly, separate gains can boost the low and high frequency bands depending upon the relationship between the U and V bandwidths.

Figure 9:
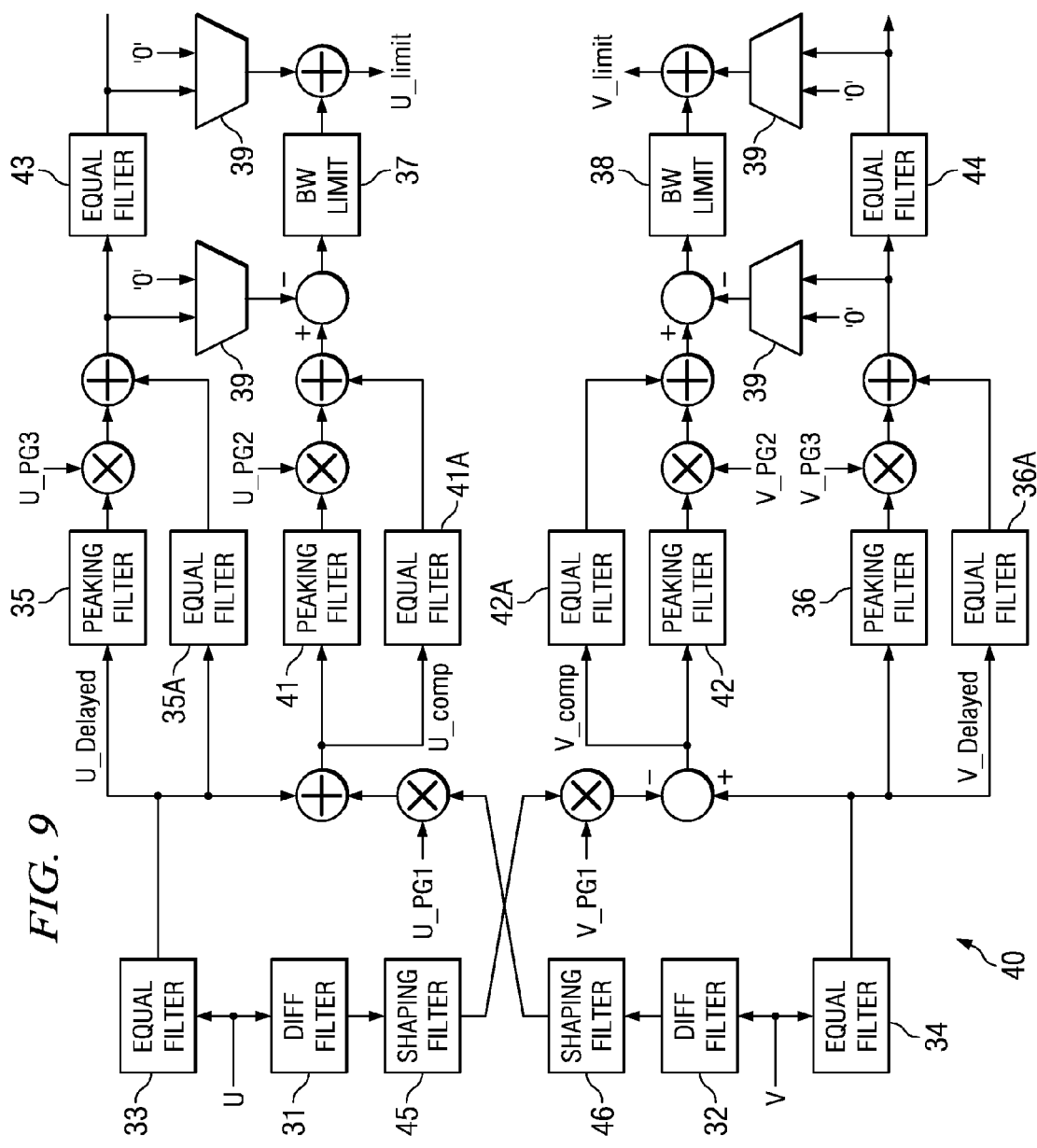
FIG. 9 is a system block diagram of another embodiment of the present invention.
Figure 11:
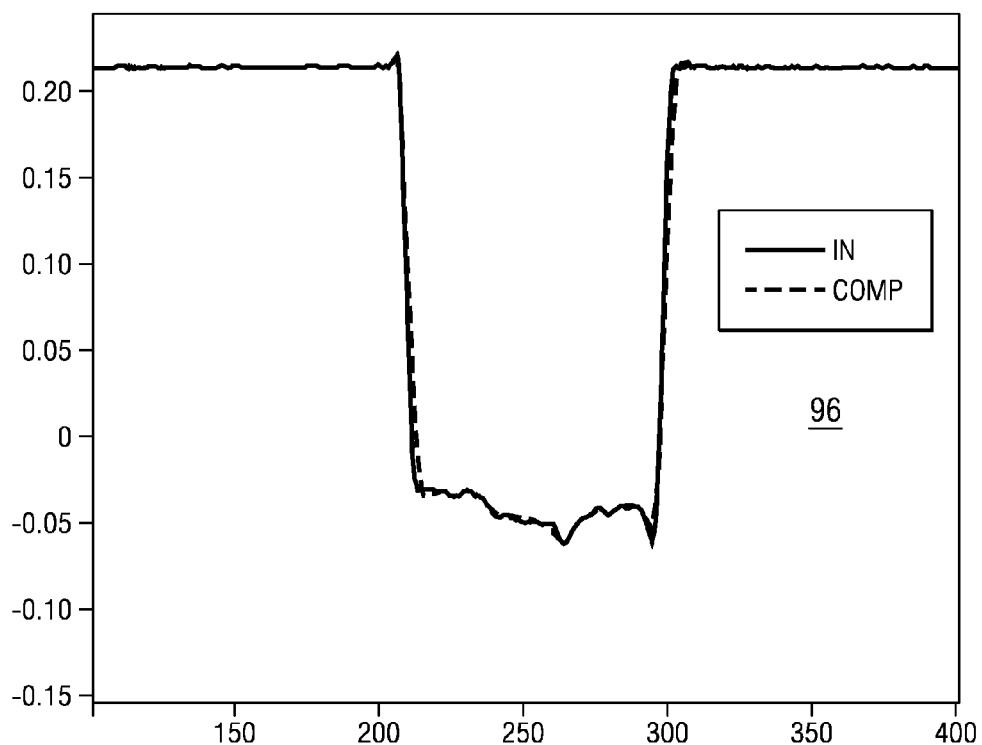
FIG. 11 is a graph of a U channel component response in an IF stage mistuned by −125 kilohertz.
Figure 12:
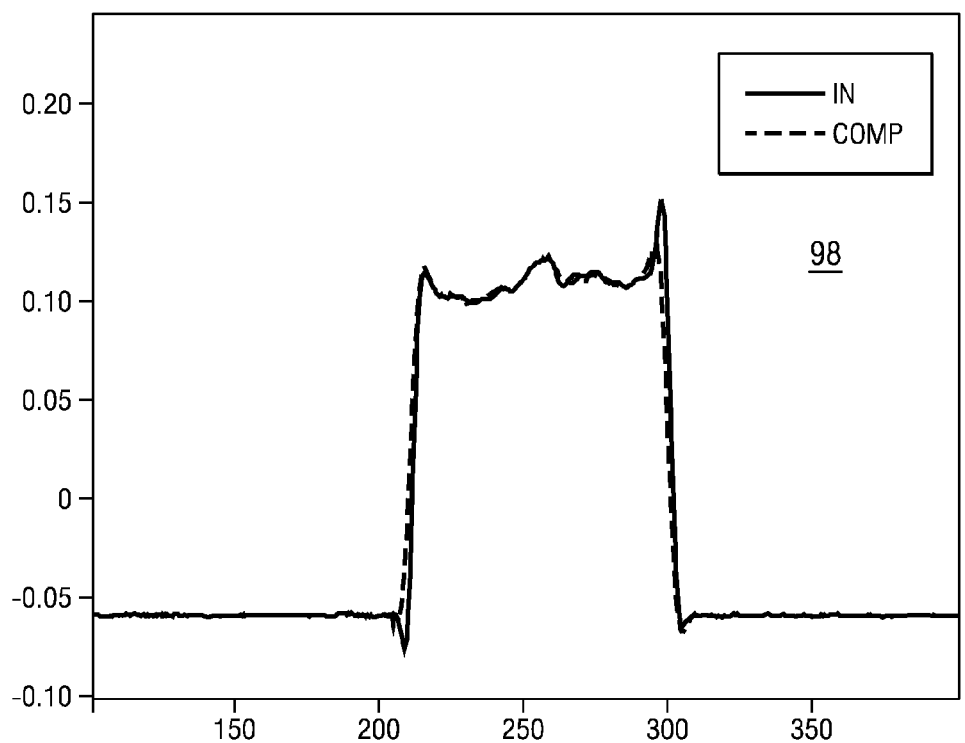
FIG. 12 is a graph of a V channel component response in an IF stage mistuned by −125 kilohertz.
Figure 13:
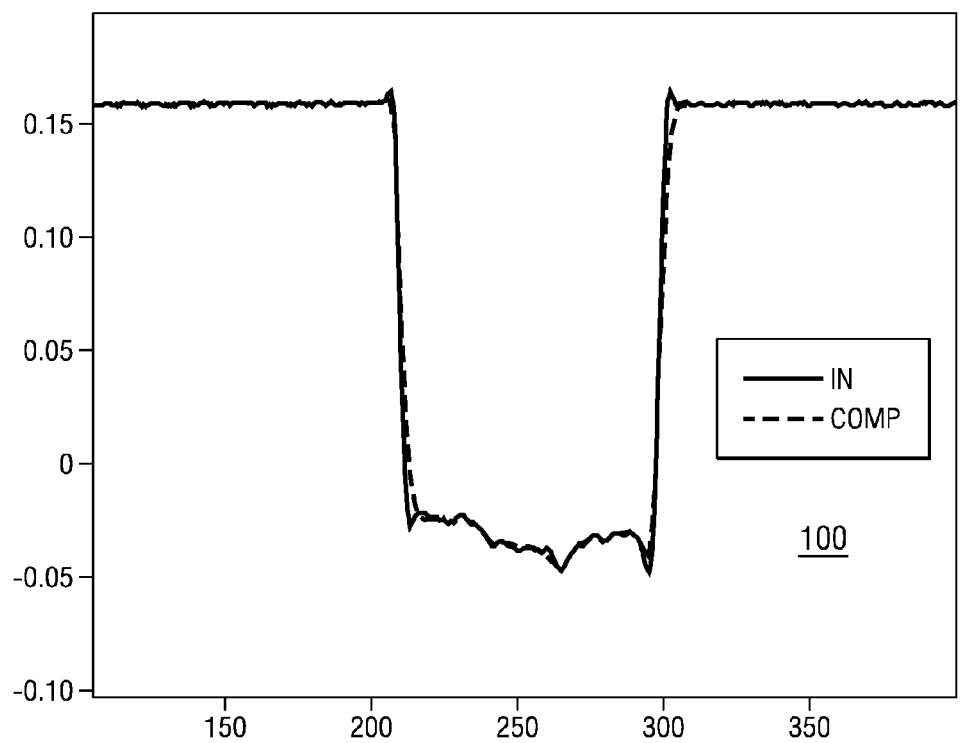
FIG. 13 is a U channel component response in an IF stage mistuned by +125 kilohertz.
Figure 14:
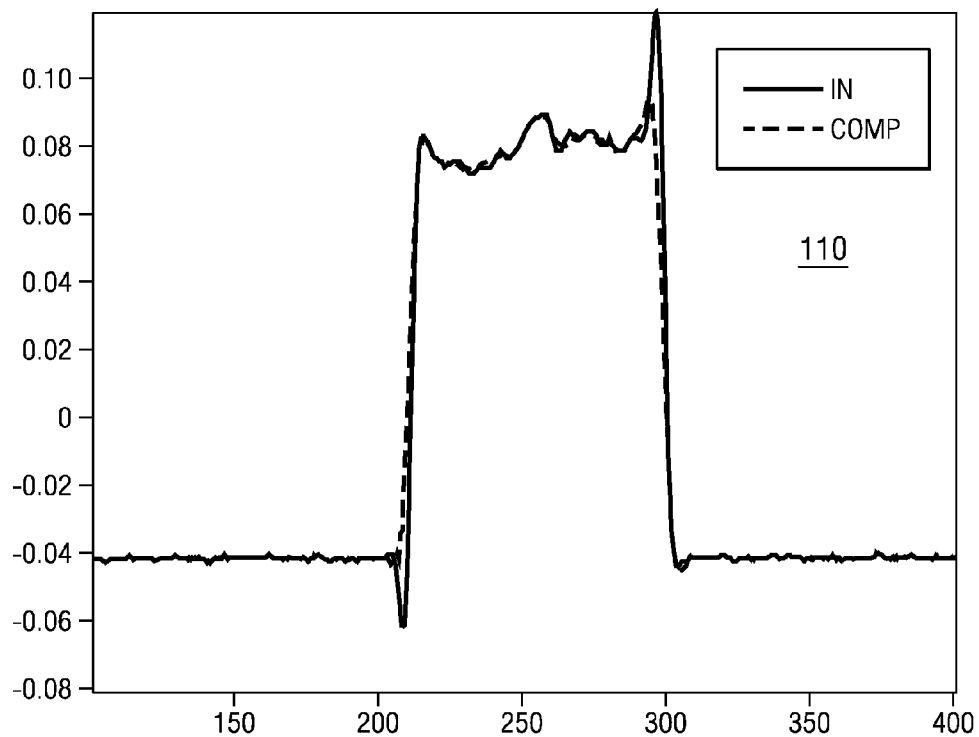
FIG. 14 is a V channel component response in an IF stage mistuned by +125 kilohertz.

Referring now to FIG. 9, an alternate base band architecture for IF compensation is illustrated generally as architecture 40. Architecture 40 is substantially the same as architecture 30 illustrated in FIG. 8, which the exception of shaping filters 45, 46 applied in the estimate of the crosstalk interference derived from each of the color difference channels U and V. In the case of architecture 40, shaping filters 45, 46 are designed to have characteristics that correlate with those of the IF stage tuner. Differential filters 31 and 32 are not particularly correlated with the characteristics of the IF stage tuner, and typically correct first order distortion. The correction of first order distortion provides a significant improvement if the IF stage tuner, and shaping filters 45, 46 shape the compensation signal to better match the distortion in the IF stage tuner. Shaping filters, 45, 46 can be implemented as FIR filters with programmable tap coefficients. In operation, shaping filters 45, 46 can be modeled as a delay of the primary compensation signal to permit the generation of multiple copies of signals with various delays and games that can be summed to produce a more refined compensation signal. Accordingly, the estimated contribution of the cross-talk interference is shaped with particularity to compensate the IF stage to further diminish the problems encountered with sharply changing features in a television signal.

Figure 10:
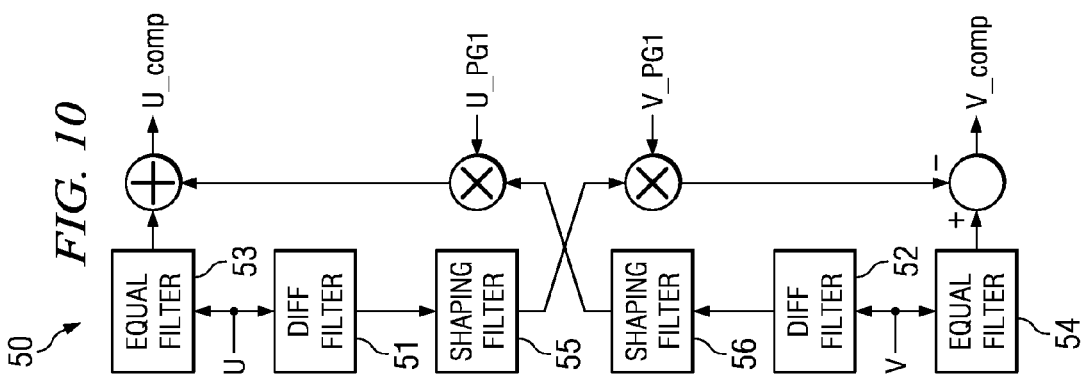
FIG. 10 is a portion of a system block diagram illustrating an aspect of the present invention.

Referring now to FIG. 10, a simple base band architecture 50 for IF compensation of SAW filter-based stages is illustrated. In this instance, architecture 50 is substantially similar to the front end of architecture 40 illustrated in FIG. 9. However, architecture 50 is a simplified architecture with compensation provided for estimates of cross-talk interference compensation. Accordingly, high and low frequency compensation performed in architecture 30 and 40 is omitted from architecture 50 to provide a simplified compensation used in conjunction with SAW filter based stages.

As with other embodiments, the color difference signals U and V are applied to a differential filter 51, 52, respectively, the output of which is applied to a shaping filter 55, 56. The shaping filter is designed in accordance with the SAW based filter stages used in the IF tuning stage. The outputs of shaping filters 55, 56 are applied to the opposite color difference channel with a gain UPG1, VPG1, respectively, and added in the case of the compensation applied to the U color difference channel, and subtracted in the case of the compensation applied to the V color difference channel. The resulting compensated color difference signals may be used in a modulator 22 such as that illustrated in FIG. 3.

Referring now to FIGS. 11-14, graphs 96, 98, 100 and 110 illustrate the frequency response for the U and V channels, respectively, when the IF stage is mistuned by +/−125 kilohertz. These graphs illustrate and simulate responses to a particular source of distortion in the frequency shifted signal, namely, IF mistuning. As can be seen in graphs 96, 98, 100 and 110, the compensated signal agrees fairly well with the input signal, with small differences being observed in undershoot and overshoot near large transition areas of the graphs. In particular, the most noticeable differences are observed in FIG. 14, where graph 110 shows a large undershoot and overshoot at a beginning and end of transition areas in the V color difference signal where the IF stage is mistuned by +/−125 kilohertz. Accordingly, the compensation provided in the base band according to the present invention obtains a substantial improvement over prior art compensation since the input signal and the compensated signal generally agree very well with little deviation except in transition areas.

Figure 15:
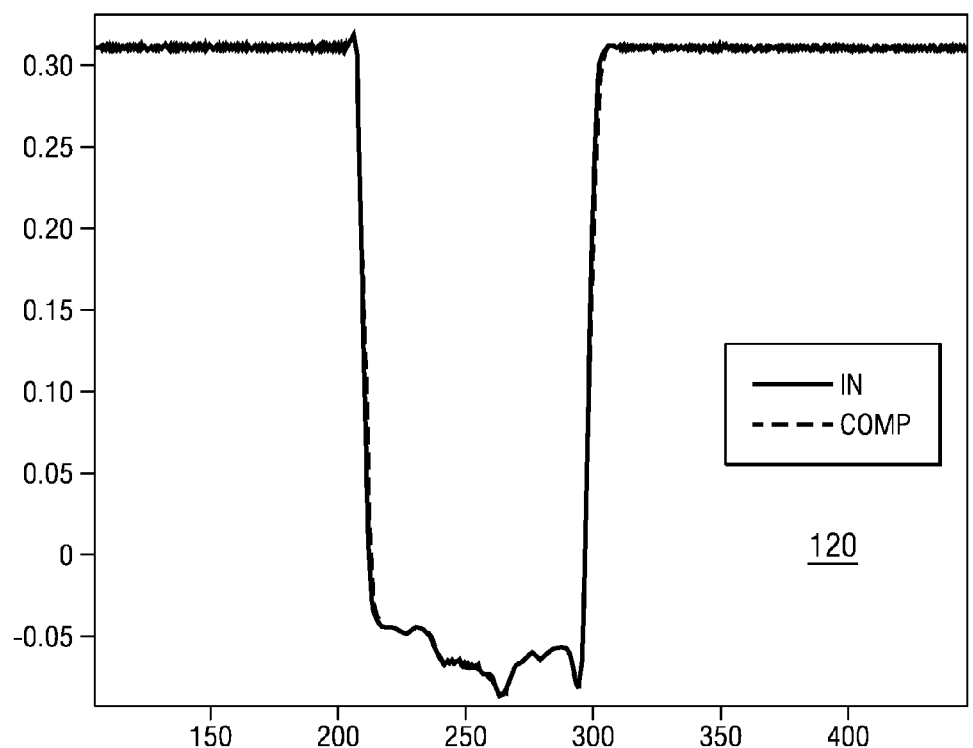
FIG. 15 is a U channel component response in an IF stage with a SAW filter.
Figure 16:
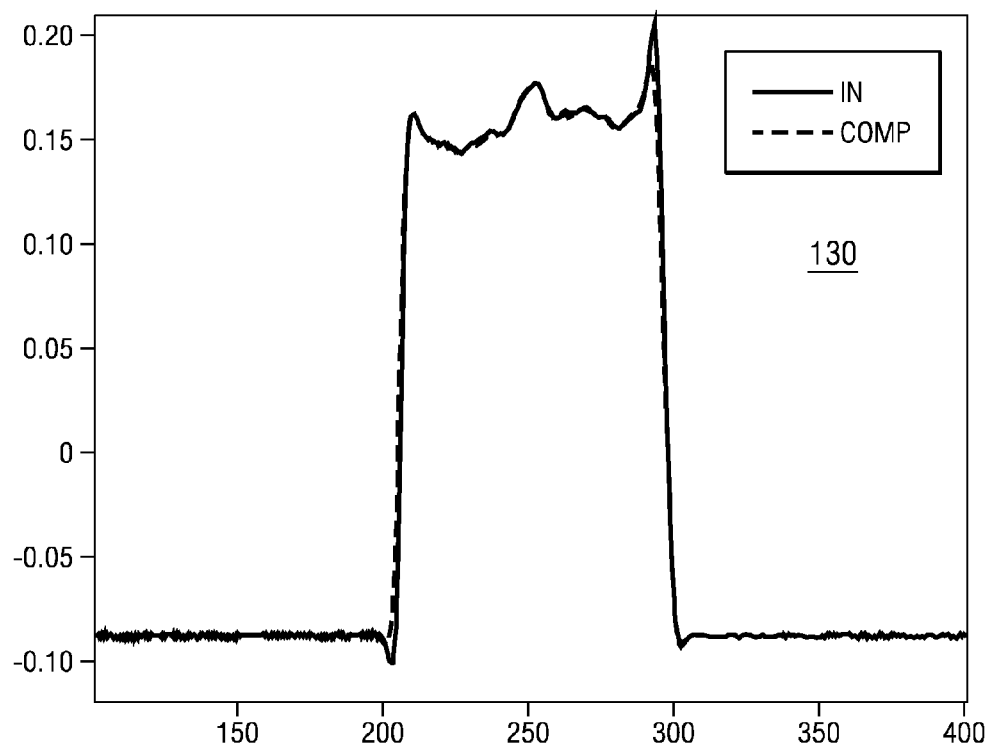
FIG. 16 is a V channel component response in an IF stage with a SAW filter.

Referring now to FIGS. 15 and 16, test trace images are illustrated for channels U and V in an IF stage constructed using SAW filters as shown in graphs 120 and 130, respectively. In the traces in graphs 120 and 130, amplification factors UPG1 and VPG1 are set to 0.25, with respect to architecture 50 illustrated in FIG. 10. Aside from IF mistuning, another source of distortion in an IF stage is poor SAW filter design and frequency response. Accordingly, graphs 120, 130 illustrate responses in IF stages with a SAW filter as purposely made to have a poor response to simulate the effects of the compensation provided in accordance with the present invention. Between graphs 120, 130, graph 130 illustrates the largest deviation between the input signal and the compensation signal, as most readily observed near the areas of undershoot and overshoot where large or fast transitions occur.

Figure 17:
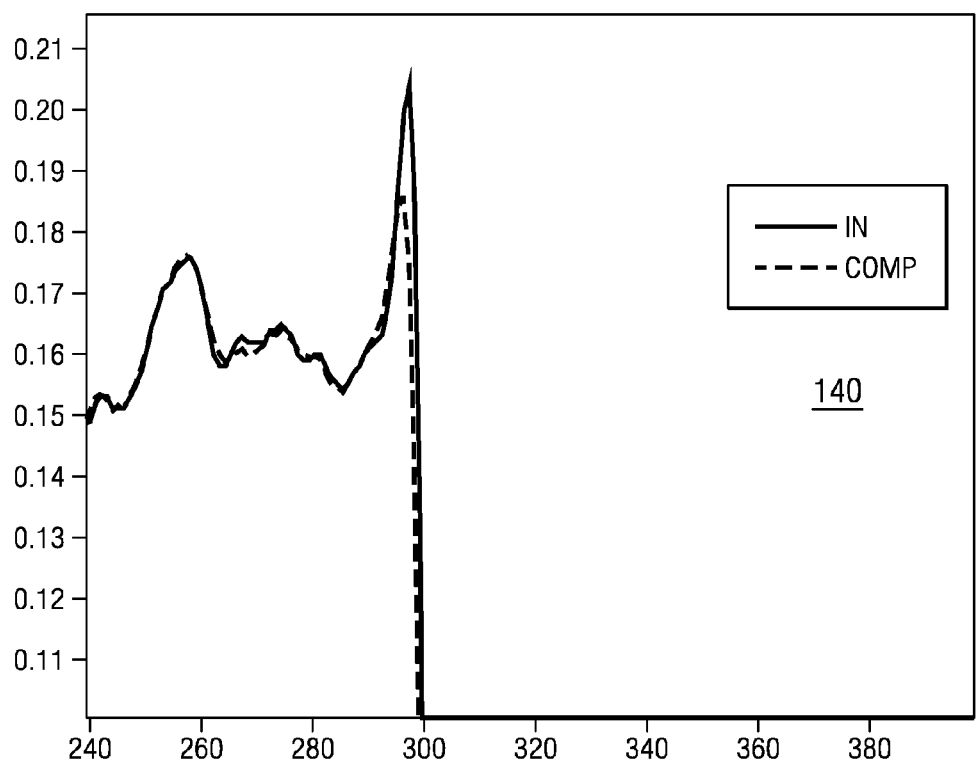
FIG. 17 is a graph showing a close-up view of a peak of FIG. 16.
Figure 18:
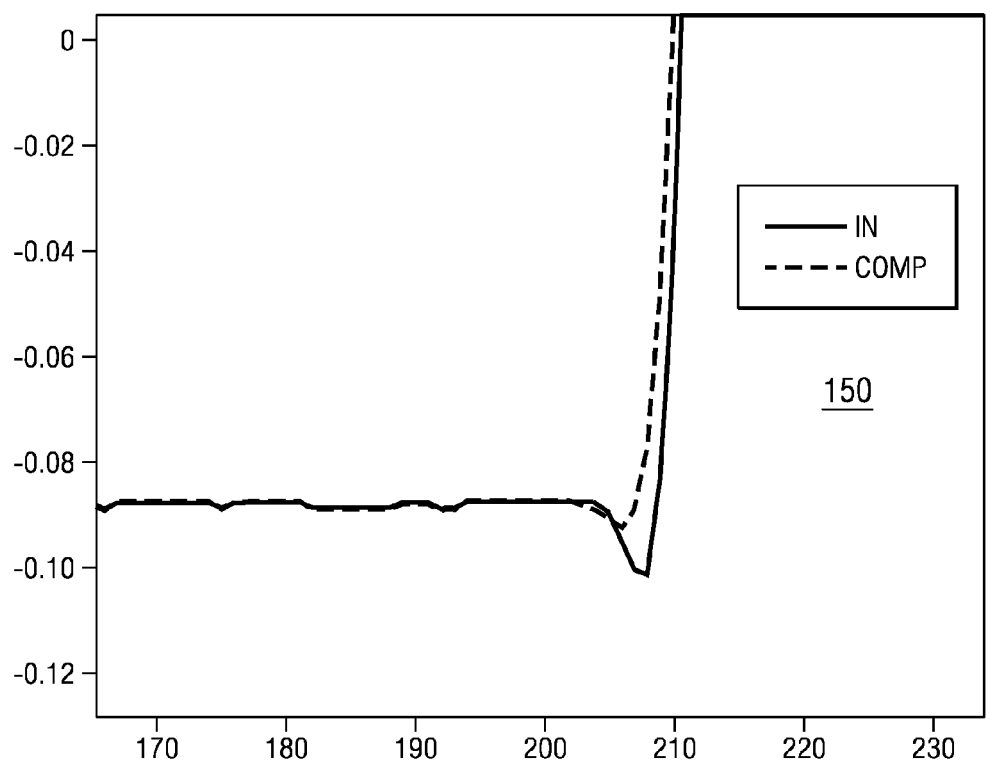
FIG. 18 is a graph illustrating a close-up view of a valley of FIG. 16.

Referring to FIGS. 17 and 18, graphs 140 and 150 focus in on areas of overshoot and undershoot in comparisons between input signals and compensation signals. It can be readily observed in graphs 140 and 150 that the deviation, even on a smaller scale, between the input and compensation signal is fairly small. Graphs 140 and 150 represent the overshoot and undershoot areas illustrated in graph 130 corresponding to a V channel color difference signal.

Figure 19:
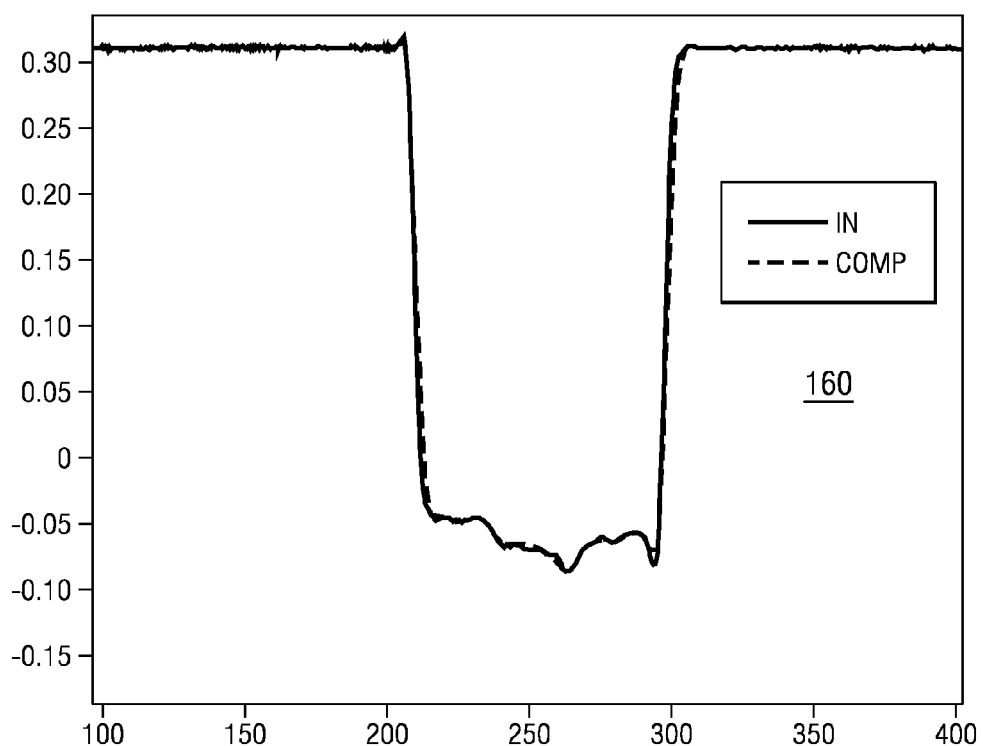
FIG. 19 is a graph of a U channel component response in an IF stage with a SAW filter.
Figure 20:
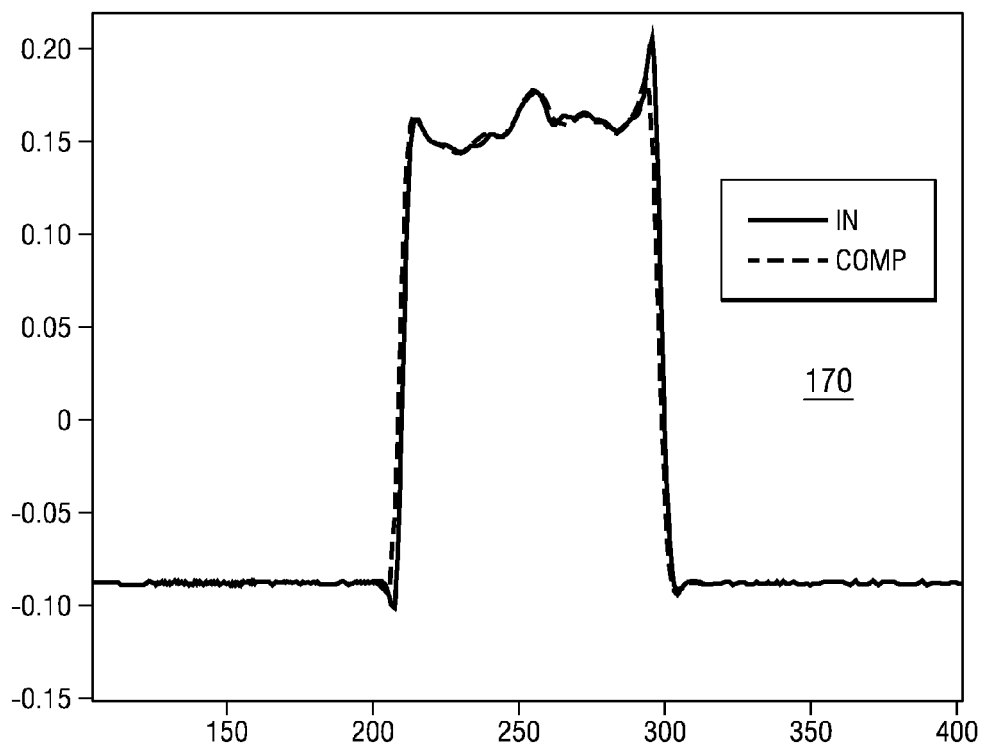
FIG. 20 is a graph of a V channel component response in an IF stage with a SAW filter.

Referring to FIGS. 19 and 20, a trace for a test input image in both the U and V channels is illustrated in graphs 160, 170, respectively. As with the previous examples, there is a large degree of correspondence between the input signal and the compensated signal, with areas of non-correspondence occurring near sharp transitions. In these examples, the amplification variables UPG1 and VPG1 as illustrated in FIG. 10 are both set to 0.5, or twice as high as the previous examples.

Figure 21:
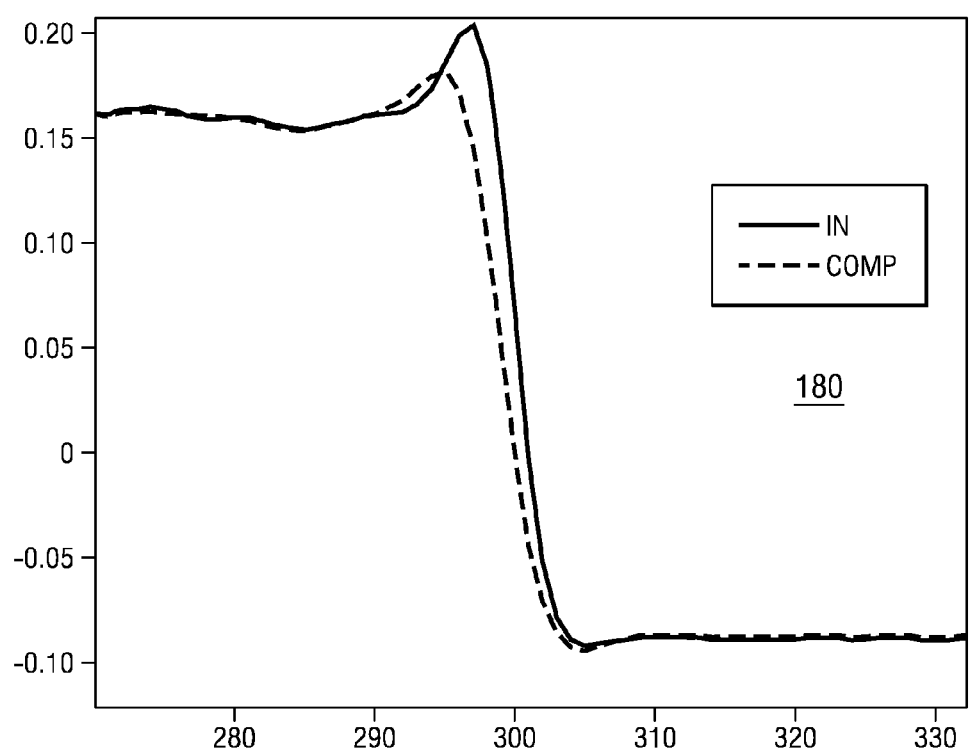
FIG. 21 is a graph illustrating an enlarged view of a downward signal transition illustrated in FIG. 20.
Figure 22:
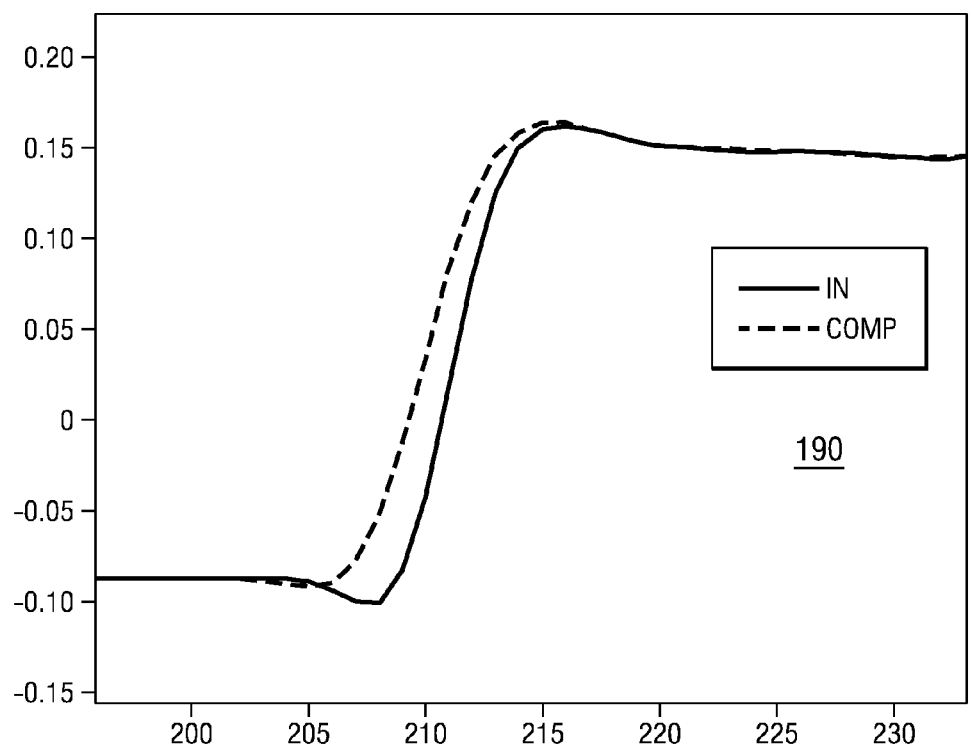
FIG. 22 is a graph illustrating an enlarged view of an upward signal transition illustrated in FIG. 20.

Referring now to FIGS. 21 and 22, graphs 180 and 190 represent close-up views of the sharp transition areas illustrated in graph 170 of FIG. 20. Accordingly, graph 180 illustrates a close-up view of the sharp transition from a low to high value in graph 170. As can be seen in the close-up view of graph 180, the input signal and the compensated signal generally correspond very well. In each of the cases in graphs 180 and 190, the compensation signal lags slightly behind the input signal with a slope that is not quite as steep as the input signal. In addition, graph 180 shows the compensation signal is slightly damped in that it does not achieve the same magnitude as the input signal in the overshoot area near the rapid transition. Similarly, graph 190 illustrates a slightly damped compensation signal since the undershoot does not achieve the same magnitude range as that of the input signal. The compensated signals therefore provide good correlation with the input signals, even when the IF stage is composed of degraded or poorly designed SAW filters.

As discussed above, the present invention has the advantage of improved compensation for distortion in the frequency signals that may cause cross-talk between the color difference signals. The technique of the present invention provides compensation in the base band signal, rather than in the composite signal to achieve greatly improved performance.

One performance advantage that derives from performing IF compensation in the base band is the elimination of IF compensation impact on the luma. If the luminance information were impacted by the compensation at the IF stage, additional hardware would be needed to cancel the effect of compensation on the luminance information. Because the color information is already separated in the base band, there is no compensation effect on the luminance information.

Another advantage of the present invention is the use of an efficient architecture for realizing the base band compensation in accordance with the present invention. The signals for both color difference signals U and V can share portions of the same circuitry that can be realized in silicon. Accordingly, the present invention permits a reduction in silicon area that approaches 50%, which provides significant savings in both the cost of construction of silicon circuitry and the volume of components that can be produced in a given manufacturing process.

In the case where the IF stage is based on SAW filters, the architecture of the present invention can be further simplified and maintain satisfactory results for base band compensation. In particular, IF stages may employ newer SAW filters that have constant group delays and increased symmetry in their output. In these cases, the architecture of the base band compensation in accordance with the present invention can be simplified in accordance with architecture 50 illustrated in FIG. 10. In the case of the simplified architecture 50 used with a SAW filter based IF stage, the compensation performed according to the present invention in the base band provides sufficiently high performance to significantly improve upon prior systems where compensation is performed on the composite signal.

Still another advantage of the present invention is the ability of the architecture to be readily adapted to a number of different types of IF stages, including those based on SAW filters. The compensation architecture has built-in programmability through the use of amplification values in the different color difference signals so that the compensation can be specifically tuned to the IF stage. Accordingly, further improvements in performance may be obtained with the present invention that are not available in the prior art.

In addition, the present invention significantly reduces or eliminates artifacts caused by IF stage mistuning in a default setting. The artifacts readily observed in prior configurations due to sharp transitions in the image signal are significantly reduced or eliminated in accordance with the present invention. The present invention provides considerably better results than the prior configurations, as observed in the visible video images, as well as the color waveforms.

Although the present invention has been described in relation to particular embodiments thereof, other variations and modifications and other uses will become apparent to those skilled in the art from the description. It is intended therefore, that the present invention not be limited not by the specific disclosure herein, but to be given the full scope indicated by the appended claims.

What is claimed is:

1. An apparatus to compensate for distortion in a video decoder, the apparatus comprising:
   a compensator that is coupled to a plurality of input channels and that has a plurality of compensated channels, wherein the compensator includes:
      a plurality of first filters, wherein each first filter is coupled to at least one of the input channels; and
      a plurality of gain elements, wherein each gain element generates a multiplied output by multiplying an output from at least one of the first filters with a first digital gain, and wherein each gain element combines its multiplied output with another input channel to produce at least one of the compensated channels;
      a plurality of second filters, wherein each second filter is coupled to and applies at least one second digital gain to at least one of the input channels and at least one of the compensated channels, and wherein each second filter produces a filtered channel;
      a selection network that selects at least one of the filtered channels of the second filters or at least one of compensated channels; and
      a digital control that provides the first digital gain to each gain element, the second digital gain to each second filter, and at least one control signal to the selection network.

2. The apparatus according to claim 1, wherein the first filters are differential filters.

3. The apparatus according to claim 1, wherein the first filter includes a differential filter and a shaping filter.

4. The apparatus according to claim 1, wherein digital control outputs a plurality of the first and second digital gains are 4 bits.

5. The apparatus according to claim 1, wherein the selection network further comprises a plurality of multiplexers.

6. The apparatus according to claim 1, wherein each second filter further comprises a plurality of peaking filters.

7. An apparatus to compensate for distortion in a video decoder, the apparatus comprising:
   a plurality of channels;
   a plurality of compensation networks, wherein each compensation network receives an input signal from at least one of the plurality of channels, and wherein each compensation network includes:
      a compensator that receives the input signal, the compensator having:
         a first filter that filters the input signal;
         a first gain element generates a multiplied output by multiplying an output from the first filters with a first digital gain, and wherein the first digital gain element combines its multiplied output with another input signal to produce a compensated signal;
      a first peaking filter that receives the input signal, wherein the first peaking filter filters the input signal and multiplies it by a second digital gain;
      a second peaking filter that receives the compensated signal, wherein the second peaking filter filters the compensated signal and multiplies it by a second digital gain;
      a combination network that receives a first selection signal and that that combines outputs of the first peaking filter and the second peaking filter to generate a peak signal
      a multiplexer that receives a second selections signal so as to select between the peak signal and the compensated signal; and
   a digital control that communicates the first digital gain, the second digital gain, the first selection signal, and the second selection signal to each compensation network.

8. The apparatus of claim 7, wherein the first filter is a differential filter.

9. The apparatus of claim 7, wherein the first filter further comprises a differential filter and a shaping filter.

10. The apparatus of claim 7, wherein digital control outputs a plurality of the first and second digital gains are 4 bits.

* * * * *